I. GEARY.
TIE FITTING.
APPLICATION FILED MAY 13, 1915.
1,237,500.
Patented Aug. 21, 1917.
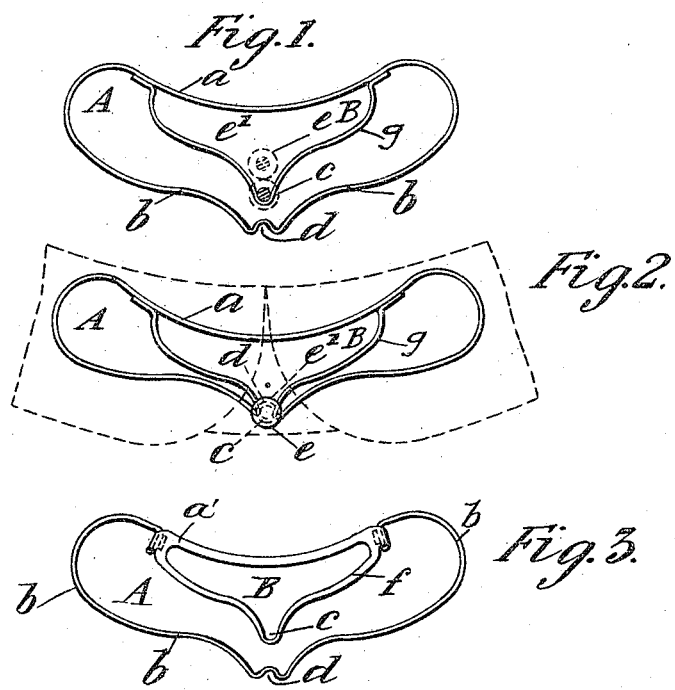
Witnesses:
M. E. McHale
[signature]
Inventor
Isaac Geary
by
[signature]
Attorney.

UNITED STATES PATENT OFFICE.

ISAAC GEARY, OF LONDON, ENGLAND.

TIE-FITTING.

1,237,500.  Specification of Letters Patent.  Patented Aug. 21, 1917.

Application filed May 13, 1915. Serial No. 27,878.

*To all whom it may concern:*

Be it known that I, ISAAC GEARY, a subject of the King of Great Britain, residing in London, England, have invented certain new and useful Improvements in Tie-Fittings, of which the following is a specification.

This invention relates to a necktie fitting or supporting device for use with a turn-down or double collar, the fitting being of a kind that is formed of a piece of spring wire which is bent in a manner to form two wings for positioning between the folds of the collar and a loop or bight adapted to pass over the head of a collar stud and thereby grip the upper portion of the stud shank, and is connected with a depending member also formed with a bight for passing over the stud head and gripping the lower portion of its shank, so that the fitting can be securely locked to the collar stud shank and cannot fall off or be removed until it is again unlocked for the purpose by releasing the bights from the shank.

It consists in an improved construction which allows a tie to be itself tied to or knotted on the fitting and be untied or removed therefrom at will. To this end the fitting is constructed to include a tie-supporting part which is disposed relatively to the depending member in a manner to permit a tie to be removably attached or knotted to it.

The invention will be described with reference to the accompanying drawing, in which Figure 1 is a front view of a necktie fitting formed entirely of wire and constructed according to this invention. The figure shows the shape of the fitting before it is applied to a collar and secured to the collar stud; Fig. 2 is a front view of the fitting in Fig. 1, as it appears when fixed in position on the stud, the outline of the collar being shown in broken lines; and Fig. 3 is a modification of the fitting shown in Figs. 1 and 2 formed partly of wire and partly of sheet material.

In Figs. 1 and 2 the tie-supporting part $a$ is formed integrally with the wings $b$ and is attached, in any suitable manner, to the depending locking member above referred to and denoted by the letter $g$. In Fig. 3 the tie-supporting part $a'$ is formed integrally with the depending member $f$ which is composed of sheet material and attached to wings $b$. Both part $a$ and part $a'$ are so shaped and disposed relatively to the depending members $g$ and $f$, respectively, that a space B is inclosed through which the ends of a tie can be passed in the operation of tying or knotting it on the tie-supporting part $a$ or $a'$. The fitting is curved in the customary manner to fit snugly around a collar.

The wings $b$, with the part $a$ in Fig. 1 or the part $a'$ in Fig. 2 form an elongated closed loop A of suitable shape. In the lower portion of the loop and in the depending locking members $g$ and $f$ are formed two oppositely directed bights or indentations $c$, $d$. In using the device the bight $c$ on the dependent members $g$ or $f$ is first passed over the collar stud head $e$ (shown in broken lines in two positions in Fig. 1) and made to engage the lower portion or side of the stud shank $e'$; the lower portion of the loop A is then pressed upward toward the tie-supporting part $a$ or $a'$ and in a way to cause the bight $d$ thereon to pass or slide over the head of the stud and by dropping down automatically behind it to engage the upper part or side of the collar stud shank as indicated in Fig. 2. The fitting or device thus becomes locked to the collar stud by reason of the grip of the two bights on the upper and lower parts of the stud shank.

To remove the fitting, the lower limb of the loop A is again pressed upward to cause the bight $d$ to be raised from off the top of the collar stud shank $e'$ sufficiently high to clear the head $e$ of the stud when the lower limb of loop A is drawn away from the collar for the purpose of removing the fitting and tie. On the lower limb clearing the head the fitting becomes released or unlocked and the upper limb is then free to be removed from the stud.

In forming the lower bight $d$ the depth of the depression would be as shallow as may be necessary, so that the side portions forming the recess or bight may not appear below the head of the stud.

Having now described the nature of the said invention and the best means I know of carrying the same into practical effect, I claim:—

1. A collar stud necktie fitting, comprising in combination spring wire wing portions laterally and upwardly directed for positioning between the folds of a collar, an upper cross piece connecting the wing portions and adapted to detachably support the necktie, a part depending from the cross piece and having a downwardly directed bight adapted to pass over and engage the lower side of a collar stud shank, and a lower part intermediate of and connecting the wing portions, said lower part being disposed apart from and normally below the dependent part and formed with an upwardly directed bight adapted to be sprung into a position above the said dependent part and the said stud shank so as to engage the upper side of the latter and thereby lock the fitting to said shank, substantially as described.

2. A collar stud necktie fitting, comprising in combination spring wire wing portions laterally and upwardly directed for positioning between the folds of a collar, an upper cross-piece extending directly between the wing portions and adapted to detachably support a necktie, a part depending from the cross piece and having a downwardly directed bight adapted to pass over and engage the lower side of a collar stud shank, and a lower part intermediate of and connecting the wing portions, said lower part being disposed apart from and normally below the dependent part and formed with an upwardly directed bight adapted to be sprung into a position above the said dependent part and the said stud shank so as to engage the upper side of the latter and thereby to lock the fitting to said shank, substantially as described.

In testimony whereof I have signed my name to this specification in the presence of two subscribing witnesses.

ISAAC GEARY.

Witnesses:
JOSEPH WILLARD,
WALTER J. SKERTEN.

Copies of this patent may be obtained for five cents each, by addressing the "Commissioner of Patents, Washington, D. C."